(12) United States Patent
Deegan

(10) Patent No.: US 11,661,487 B2
(45) Date of Patent: May 30, 2023

(54) ACTIVATING SURFACES FOR SUBSEQUENT BONDING

(71) Applicant: Henkel AG & Co. KGaA, Duesseldorf (DE)

(72) Inventor: Brian Deegan, Tallaght (IE)

(73) Assignee: Henkel AG & Co. KGaA, Duesseldorf (DE)

( * ) Notice: Subject to any disclaimer, the term of this patent is extended or adjusted under 35 U.S.C. 154(b) by 345 days.

(21) Appl. No.: 16/713,498

(22) Filed: Dec. 13, 2019

(65) Prior Publication Data

US 2020/0239655 A1 Jul. 30, 2020

Related U.S. Application Data

(63) Continuation of application No. PCT/EP2018/064924, filed on Jun. 6, 2018.

(30) Foreign Application Priority Data

Jun. 13, 2017 (GB) ...................................... 1709352
Oct. 10, 2017 (GB) ...................................... 1716575

(51) Int. Cl.
  *C08J 7/18* (2006.01)
  *C09J 133/08* (2006.01)
  *C09J 163/00* (2006.01)

(52) U.S. Cl.
  CPC .............. *C08J 7/18* (2013.01); *C09J 133/08* (2013.01); *C09J 163/00* (2013.01);
  (Continued)

(58) Field of Classification Search
  CPC ...... C08J 3/28; C08J 2345/00; C08J 2347/00; C08J 2371/00; C08J 7/18; C08J 2377/00;
  (Continued)

(56) References Cited

U.S. PATENT DOCUMENTS 5,605,999 A 2/1997 Chu et al.
6,433,091 B1 8/2002 Cheng
(Continued)

FOREIGN PATENT DOCUMENTS

CN 1729237 A 2/2006
CN 101479356 A 7/2009
(Continued)

OTHER PUBLICATIONS

Machine Translation of WO-2017033980-A1 (Year: 2017).*

(Continued)

*Primary Examiner* — Daniel McNally
(74) *Attorney, Agent, or Firm* — Mary K. Cameron

(57) ABSTRACT

A method of activating a surface of a plastics substrate formed from:
  (a) polyaryletherketone such as polyether ether ketone (PEEK) polyether ketone ketone (PEKK), polyether ketone (PEK); polyether ether ketone ketone (PEEKK); or polyether ketone ether ketone ketone (PEKEKK);
  (b) a polymer containing a phenyl group directly attached to a carbonyl group, optionally wherein the carbonyl group is part of an amide group, such as polyarylamide (PARA);
  (c) polyphenylene sulfide (PPS); or
  (d) polyetherimide (PEI);
for subsequent bonding,
the method comprising the step of exposing the surface to actinic radiation wherein the actinic radiation:
  includes radiation with wavelength in the range from about 10 nm to about 1000 nm;
  the energy of the actinic radiation to which the surface is exposed is in the range from about 0.5 J/cm² to about 300 J/cm².

(Continued)

Hard to bond substrates are then more easily subsequently bonded for example using acrylic, epoxy or anaerobic adhesive.

25 Claims, 1 Drawing Sheet

(52) U.S. Cl.
CPC ........ *C08J 2371/00* (2013.01); *C08J 2377/00* (2013.01); *C08J 2379/08* (2013.01); *C08J 2381/04* (2013.01)

(58) Field of Classification Search
CPC ...... C08J 2379/00; C08J 2381/00; C09J 5/02; C09J 133/08; C09J 163/00
See application file for complete search history.

(56) References Cited

U.S. PATENT DOCUMENTS

| | | | |
|---|---|---|---|
| 6,844,080 | B2 | 1/2005 | Kneafsey et al. |
| 2007/0006967 | A1* | 1/2007 | Sanftleben .......... B29C 65/7814 156/331.7 |
| 2009/0227755 | A1* | 9/2009 | DeVoe .................. C08F 120/10 526/348 |
| 2012/0107615 | A1 | 5/2012 | Hetzler et al. |
| 2013/0177770 | A1* | 7/2013 | Mori ..................... C07F 7/0814 156/330.9 |

FOREIGN PATENT DOCUMENTS

| | | | |
|---|---|---|---|
| CN | 102089532 A | 6/2011 | |
| CN | 103080257 A | 5/2013 | |
| DE | 102011007552 A1 | 10/2012 | |
| EP | 2623572 | 8/2013 | |
| EP | 2955210 A1 | 12/2015 | |
| FR | 1581361 | 9/1969 | |
| JP | H01197588 A | 8/1989 | |
| JP | H01232557 A | 9/1989 | |
| JP | H01313580 A | 12/1989 | |
| JP | H03143927 A | 6/1991 | |
| JP | H03197028 A | 8/1991 | |
| JP | 05132569 A | 5/1993 | |
| JP | H05202207 A | 8/1993 | |
| JP | H06166766 A | 6/1994 | |
| WO | 2006059773 A1 | 6/2008 | |
| WO | 2010058848 A1 | 4/2012 | |
| WO | WO-2017033980 A1 * | 3/2017 | ............... C08J 7/00 |
| WO | 2018228893 A1 | 12/2018 | |

OTHER PUBLICATIONS

International Search Report issued in connection with International Application No. PCT/EP2018/064924 dated Oct. 9, 2018.
J. Mater. Chem., 1994, 4(7), 1157.
Chem. Res. Chinese Universities 2012, 28(3), 542-545.
International Search Report of PCT/EP2019/084009 dated Mar. 23, 2020.
A. Casu, et al., "Photolysis and photooxidation of poly(butylene terephthalate)—fibre glass systems", Polymer, 1995, pp. 4005-4009, vol. 36, No. 21, Copyright© 1995 Elsevier Science Ltd., Great Britain.
P. Gusman, et al., "Comparison of the UV-degradation chemistry of polypropylene, polyethylene, polyamide 6 and polybutylene terephthalate", Polymer Degradation and Stability, 1999, pp. 433-441, vol. 65, DSM Research BV, Geleen, The Netherlands, and University of Messina, Messina, Italy.
A. Rivaton, et al., "Oxidative and photooxidative degradations of PP/PBT blends", Polymer Degradation and Stability, 1998, pp. 127-143, vol. 62, © 1998 Elsevier Science Limited, Great Britain, Laboratoire de Photochimie Moleculaire et Marcomoleculaire, Universite Blaise Pascal (Clermont-Ferrand), Aubiere Cedex, France.
I. Mathiesen, et al., "Surface Oxidation of poly Ether Ether Ketone Films using Ultraviolet/Ozone", J. Mater. Chem., 1994, p. 1157, vol. 4(7), Institute of Surface Science and Technology, University of Technology, Loughborough, UK. Cited in specification.
H. Sun, et al., "Surface Heparinization of Poly(ether ether ketone)", Chem. Res. Chinese Universities, 2012, pp. 542-545, vol. 28(3), Department of Materials and Mechanical Engineering, Beijing Technology and Business University, Beijing, P.R. China. Cited in specification.

* cited by examiner

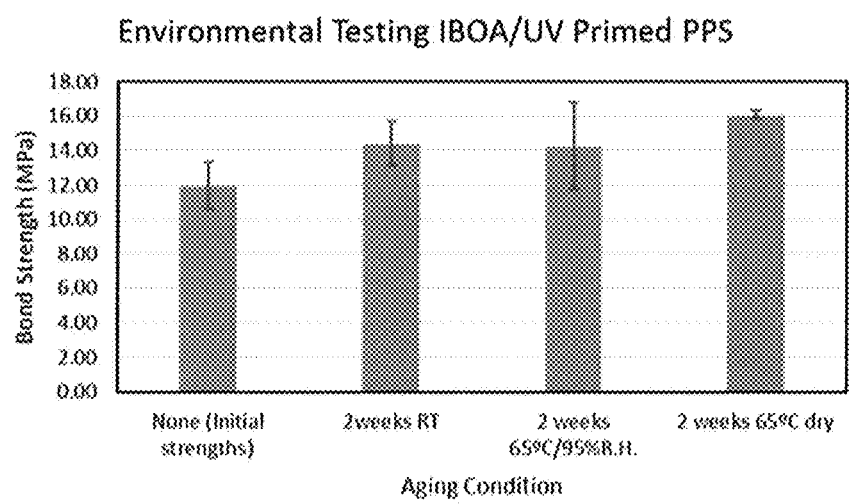

ACTIVATING SURFACES FOR SUBSEQUENT BONDING

FIELD

The present invention relates to methods for activating surfaces for subsequent bonding.

DESCRIPTION OF RELATED ART

It is known in the adhesives industry that certain substrates, such as certain plastics, are difficult to bond. At least one reason is believed to be low surface energy/low surface tension properties of the plastic to be bonded. Adhesive compositions have been specifically formulated for use to bond such substrates. Additionally or alternatively, primers have been used. Primers are applied to the substrate before subsequent over application of the adhesive. Additionally or alternatively, surface treatment of the substrates have been employed to make them more susceptible to bonding. Such treatment is often due to a physical effect such as roughening of a surface of the substrate thus making it more susceptible to bonding.

For example, in order to bond some plastics such as PEEK (polyether ether ketone); PPS (polyphenylene sulfide); polyarylamide (PARA) or polyetherimide (PEI) various techniques have been employed. PEEK is a difficult to bond material. PPS is also a difficult to bond material. So too are PARA and PEI.

It is common to surface treat such plastics materials. Such surface treatment can be carried out using chemical treatment, for example etching, such as acid etching. It is also known to use physical abrasion such as sand/grit blasting. Flame treatment and plasma techniques have also been used. In each case the treatment results in a physical change to the surface which facilitates better adhesion.

It will be appreciated that chemical treatments such as acid etching are restrictive in terms of commercial usage due to safety concerns. Also, there are physical limitations to the process, for example limitations on the application to the plastics being treated, for example when the substrate is being treated with or dipped into a chemical solution, the process must be carefully controlled. There is also an undesirable cost both from a raw materials, processing and waste perspective. Furthermore, equipment to carry out such a process is not generally easily portable. Furthermore, it is often difficult to selectively treat a discrete area that is to be bonded. Typically, surface area other than the area to be bonded is treated which is unnecessary and in some cases all of the substrate is treated. This is unnecessary and wasteful.

Plasma techniques require large-scale equipment. Apart from the capital cost there is a difficulty with the size of the equipment which makes it difficult to be portable for use, for example in confined spaces. Typically, a plasma process may utilise one or more gases and thus require safe removal of the gases. This again means that there are physical limitations to the process and the area in which the plasma treatment is carried out must be carefully controlled.

It has been reported that exposure of PEEK to UV/ozone can oxidise the surface c.f. J. Mater. Chem., 1994, 4(7), 1157. It is also being reported that immersing a PEEK substrate in a solution of acrylic acid and exposing the submersed PEEK to UV light creates a grafted layer of acrylic acid on the PEEK c.f. Chem. RES. CHINESE UNIVERSITIES 2012, 28(3), 542-545.

Physical abrasion can give variable results as it can be difficult to control this method sufficiently. Furthermore, there is typically waste abraded material as a by-product. Chemical activation can involve the use of chemicals that can be dangerous if used incorrectly. If immersion is used, then the entire substrate has to be treated rather than just an area for bonding. There may then be handling issues associated with the treated substrate because it is not possible to hold an untreated part of the substrate.

While primers can be used to great effect there is always a need for an alternative method of activating a surface for subsequent bonding. This applies in particular to PEEK, PARA, PPS or PEI which tend to be difficult to bond plastics and thus typically bond strengths tend to be lower than for other plastics—and this generally applies even when primers are used.

Notwithstanding that state of the art proposed solutions to these issues exist, it is desirable to provide alternative solutions so the end user has more choices available.

SUMMARY

In all aspects of the invention where actinic radiation is referred to the actinic radiation is from a light source specifically arranged to irradiate the substrate to be bonded, for example the source is within 1 metre thereof, for example within 30 cm thereof. So exposure means exposure to the actinic radiation from such a light source and does not include ambient light such as natural light, light from overhead lights etc.

Where the substrate is treated prior to exposure to UV it will be appreciated that that the treated area of the substrate is exposed to the actinic radiation.

The invention provides a method of activating a surface of a plastics substrate formed from:
  (a) a polyaryletherketone such as polyether ether ketone (PEEK) polyether ketone ketone (PEKK), polyether ketone (PEK); polyether ether ketone ketone (PEEKK); or polyether ketone ether ketone ketone (PEKEKK);
  (b) a polymer containing a phenyl group directly attached to a carbonyl group, optionally wherein the carbonyl group is part of an amide group, such as polyarylamide (PARA);
  (c) polyphenylene sulfide (PPS); or
  (d) polyetherimide (PEI);
  for subsequent bonding,
the method comprising the step of exposing the surface to actinic radiation wherein the actinic radiation:
  includes radiation with wavelength in the range from about 10 nm to about 1000 nm;
  the energy of the actinic radiation to which the surface is exposed is in the range from about 0.5 J/cm$^2$ to about 300 J/cm$^2$.

The actinic radiation may include radiation with wavelength in the range from about 200 nm to about 700 nm.

The energy of the actinic radiation to which the surface is exposed may be in the range from about 0.5 J/cm$^2$ to about 240 J/cm$^2$.

It will be appreciated that this energy exposure can be achieved in relatively short times.

It will be appreciated that the method of the invention works for substrates made of these materials including composite substrates such as fibre reinforced substrates made of these materials, including carbon reinforced materials.

The method of the invention does not require the incorporation of an activator within the plastics substrate. In this respect it is noted that in the past an activator that activates in response to actinic radiation, such as TiO2 has been incorporated within the substrate. Such activators are not required with the present invention.

The present invention does not require any of the treatments mentioned above to create a physical change to the surface which facilitates better adhesion such as: chemical treatment, for example etching, such as acid etching; physical treatment, such as sand/grit blasting; flame treatment; plasma treatment; ozone treatment etc.

It is also noted that the invention works where only one of two substrates to be bonded together is activated. Where two substrates are to be bonded together they may be the same but each may be any one of PEEK; PEKK; PEK; PEEKK; PEKEKK; PARA; PPS or PEI.

The polyaryletherketone is desirably polyether ether ketone (PEEK) or polyether ketone ketone (PEKK). Suitably the substrates used with the present invention include: PEEK; PEKK; PARA; PPS or PEI.

It is to be noted that the references to energy of the actinic radiation in the present invention refers to the energy of the actinic radiation experienced by/incident on the surface. This is distinct from the energy that may be emitted from a source.

The actinic radiation may be applied in any desired pattern. For example the exposing of the surface to actinic radiation is applied selectively to create areas of the surface that are activated for subsequent bonding and areas of the surface that are not activated for subsequent bonding. A mask may be used which has areas which transmit actinic radiation to create areas of the surface that are activated for subsequent bonding areas and areas which block actinic radiation to create areas of the surface that are not activated for subsequent bonding.

It will be appreciated that faster activation may be desirable for a continuously moving production line, for example where successive substrates are passed by a light source to activate them. The duration of the exposure may be from about 0.1 seconds to about 360 minutes, such as from about 0.5 seconds to about 180 minutes; for example, from about 0.5 seconds to about 30 minutes; including from about 3 seconds to about 19 minutes; optionally less than about 240 seconds.

It has been found that the method of activation works for different substrates and for activation for subsequent bonding with different adhesives. For example, the activating may be carried out for subsequent bonding with an acrylic adhesive.

In a method of the invention:
the energy of the actinic radiation to which the surface is exposed may be in the range from about 3.5 J/cm$^2$ to about 100 J/cm$^2$; and/or
the substrate may be PPS, PARA or PEI; and/or
activating may be carried out for subsequent bonding with acrylic adhesive.

In a method of the invention:
the energy of the actinic radiation to which the surface is exposed may be in the range from about 2 J/cm$^2$ to about 240 J/cm$^2$; and/or
the substrate may be PEEK, PEKK, PEK, PEEKK, PEKEKK, PPS, or PEI; and/or activating may be carried out for subsequent bonding with epoxy adhesive.

The activating may be carried out for subsequent bonding with an epoxy adhesive.

The method of the invention may comprise the step of treating the surface with a (meth)acrylate, prior to exposing the surface to actinic radiation. The (meth)acrylate may be selected from tetrahydrofurfuryl acrylate (THFA); methyl methacrylate (MMA); and isobornyl acrylate (IBOA) and any combination thereof.

In a method of the invention the plastics substrate may be PPS; and/or the activating may be carried out for subsequent bonding with acrylic adhesive; and/or the energy of the actinic radiation to which the surface is exposed may be in the range from about 25 J/cm$^2$ to about 240 J/cm$^2$.

The method of the invention may comprise the step of treating the surface with copper acrylate, prior to exposing the surface to actinic radiation.

In a method of the invention the energy of the actinic radiation to which the surface is exposed may be in the range from about 3 J/cm$^2$ to about 240 J/cm$^2$; and/or activating may be carried out for subsequent bonding with anaerobic adhesive.

The activating of a substrate may be carried out for subsequent bonding with an anaerobic adhesive.

The invention also provides a method of bonding a first substrate to a second substrate which involves activating a first substrate according to the method of the invention as set out herein and then, utilising an adhesive such as an acrylic; epoxy or anaerobic adhesive; bonding the first substrate to a second substrate.

A method of bonding of the invention may include bonding a first substrate formed from:
(a) polyaryletherketone such as polyether ether ketone (PEEK) polyether ketone ketone (PEKK), polyether ketone (PEK); polyether ether ketone ketone (PEEKK); or polyether ketone ether ketone ketone (PEKEKK);
(b) a polymer containing a phenyl group directly attached to a carbonyl group, optionally wherein the carbonyl group is part of an amide group, such as polyarylamide (PARA);
(c) polyphenylene sulfide (PPS); or
(d) polyetherimide (PEI);
to a second substrate comprising the steps of:
(i) exposing the surface of the first substrate to actinic radiation to activate the surface for subsequent bonding wherein the actinic radiation includes radiation with wavelength in the range from about 10 nm to about 1000 nm; and the energy of the actinic radiation to which the surface is exposed is in the range from about 0.5 J/cm$^2$ to about 300 J/cm$^2$,
(ii) subsequently, bonding the activated surface of the first substrate to the second substrate utilising adhesive.

The method of bonding may comprise the step of treating the surface with copper acrylate, prior to exposing the surface to actinic radiation.

The method of bonding may comprise the step of treating the surface with a (meth)acrylate, prior to exposing the surface to actinic radiation.

In all aspects of the invention where actinic radiation is employed it is desirable that the duration of the exposure is from about 0.1 seconds to about 360 minutes, such as from about 0.5 seconds to about 180 minutes; for example from about 0.5 seconds to about 30 minutes; including from about 3 seconds to about 19 minutes.

Shorter processing times are desirable so exposure for 0.5 minutes to less than about 12; 10; 8; 6; 4; 3; 2; or 1 minute are desirable. For example optimal exposure may be achieved on such time scales. In some cases times of 20 seconds or less, for example 15 seconds are less such as 10 seconds or less can be achieved.

After exposure to the (UV) radiation the adhesive is applied and bonding takes place.

The present invention provides a method of activating a surface of a plastics substrate formed from: polyaryletherketone such as polyether ether ketone (PEEK) polyether ketone ketone (PEKK), polyether ketone (PEK); polyether ether ketone ketone (PEEKK); or polyether ketone ether ketone ketone (PEKEKK);
for subsequent bonding,
the method comprising the step of exposing the surface to actinic radiation wherein the actinic radiation:
  includes radiation with wavelength in the range from about 10 nm to about 1000 nm;
  and the energy of the actinic radiation to which the surface is exposed is in the range from about 1.5 J/cm$^2$ to about 40 J/cm$^2$ for subsequent bonding with acrylic adhesive; or
  the energy of the actinic radiation to which the surface is exposed is in the range from about 4 J/cm$^2$ to about 850 J/cm$^2$ for subsequent bonding with epoxy adhesive.

The present invention provides a method of activating a surface of a plastics substrate formed from polyarylamide (PARA), for subsequent bonding, the method comprising the step of exposing the surface to actinic radiation wherein the actinic radiation:
  includes radiation with wavelength in the range from about 10 nm to about 1000 nm; and
  the energy of the actinic radiation to which the surface is exposed is in the range from about 10 J/cm$^2$ to about 30 J/cm$^2$ for subsequent bonding with acrylic adhesive.

The present invention provides a method of activating a surface of a plastics substrate formed from polyphenylene sulfide (PPS), for subsequent bonding, the method comprising the step of applying copper acrylate to the surface and then exposing the surface to actinic radiation wherein the actinic radiation
  includes radiation with wavelength in the range from about 10 nm to about 1000 nm; and
  the energy of the actinic radiation to which the surface is exposed is in the range from about 2 J/cm$^2$ to about 240 J/cm$^2$ for subsequent bonding with acrylic adhesive optionally wherein the surface is treated with (meth) acrylate, for example tetrahydrofurfuryl acrylate (THFA); methyl methacrylate (MMA); or isobornyl acrylate (IBOA) or any combination thereof, prior to exposing the surface to the actinic radiation,
  or the energy of the actinic radiation to which the surface is exposed is in the range from about 5 J/cm$^2$ to about 312 J/cm$^2$ for subsequent bonding with epoxy adhesive.

The present invention provides a method of activating a surface of a plastics substrate formed from polyarylamide (PARA), for subsequent bonding, the method comprising the step of exposing the surface to actinic radiation wherein the actinic radiation:
  includes radiation with wavelength in the range from about 10 nm to about 1000 nm;
  the energy of the actinic radiation to which the surface is exposed is in the range from about 10 J/cm$^2$ to about 30 J/cm$^2$ for subsequent bonding with acrylic adhesive.

The present invention provides a method of activating a surface of a plastics substrate formed from polyetherimide (PEI), for subsequent bonding, the method comprising the step of exposing the surface to actinic radiation wherein the actinic radiation:
  includes radiation with wavelength in the range from about 10 nm to about 1000 nm;
  the energy of the actinic radiation to which the surface is exposed is in the range from about 3 J/cm$^2$ to about 10 J/cm$^2$ for subsequent bonding with acrylic adhesive,
  or the energy of the actinic radiation to which the surface is exposed is in the range from about 6 J/cm$^2$ to about 120 J/cm$^2$ for subsequent bonding with epoxy adhesive.

The present invention provides a method of activating a surface of a plastics substrate formed from: polyaryletherketone such as polyether ether ketone (PEEK) polyether ketone ketone (PEKK), polyether ketone (PEK); polyether ether ketone ketone (PEEKK); or polyether ketone ether ketone ketone (PEKEKK);
for subsequent bonding,
the method comprising the steps of
treating the surface with copper acrylate, prior to exposing the surface to actinic radiation,
exposing the surface to actinic radiation wherein the actinic radiation:
  includes radiation with wavelength in the range from about 10 nm to about 1000 nm;
and the energy of the actinic radiation to which the surface is exposed is in the range from about 9 J/cm$^2$ to about 240 J/cm$^2$ for subsequent bonding with anaerobic adhesive.

The present invention provides a method of activating a surface of a plastics substrate formed from: polyarylamide (PPS) for subsequent bonding, the method comprising the steps of
treating the surface with copper acrylate, prior to exposing the surface to actinic radiation,
exposing the surface to actinic radiation wherein the actinic radiation:
  includes radiation with wavelength in the range from about 10 nm to about 1000 nm;
and the energy of the actinic radiation to which the surface is exposed is in the range from about 14 J/cm$^2$ to about 30 J/cm$^2$ for subsequent bonding with anaerobic adhesive.

The present invention provides a method of activating a surface of a plastics substrate formed from: polyarylamide (PARA) for subsequent bonding,
the method comprising the steps of
treating the surface with copper acrylate, prior to exposing the surface to actinic radiation,
exposing the surface to actinic radiation wherein the actinic radiation:
  includes radiation with wavelength in the range from about 10 nm to about 1000 nm;
and the energy of the actinic radiation to which the surface is exposed is in the range from about 10 J/cm$^2$ to about 30 J/cm$^2$ for subsequent bonding with anaerobic adhesive.

The present invention provides a method of activating a surface of a plastics substrate formed from: polyetherimide (PEI) for subsequent bonding, the method comprising the steps of
treating the surface with copper acrylate, prior to exposing the surface to actinic radiation,
exposing the surface to actinic radiation wherein the actinic radiation:
  includes radiation with wavelength in the range from about 10 nm to about 1000 nm;
and the energy of the actinic radiation to which the surface is exposed is in the range from about 3 J/cm$^2$ to about 30 J/cm$^2$ for subsequent bonding with anaerobic adhesive.

The invention involves exposing the plastic specimen to be bonded to actinic radiation, e.g. UV radiation, at the correct intensity for the required time prior to application of the adhesive. After exposure to the actinic (UV) radiation the adhesive is applied and the substrate is bonded to another.

This new method requires only at least one actinic radiation source, such as a UV radiation source, and any radiation source can be small and easily portable. For example it may be handheld and/or battery operated. Though of course more powerful radiation sources may be utilised and those may be powered from mains electricity.

Small areas or large areas can be treated with different equipment (spot radiation source(s) to a large array of radiation sources) depending on need. Only the area to be bonded need be exposed to the radiation. Thereafter an adhesive such as a standard two component acrylic adhesive can be used to bond the substrate to another substrate.

The method of the invention has been shown to work well with acrylic adhesives, e.g. those sold under the brand names Loctite® AA V5004 (acrylic adhesive) and Loctite® HHD8540 (acrylic adhesive) and various epoxy and anaerobic Loctite products as set out in the examples below. All Loctite® products are available from Henkel Ireland Operations & Research Ltd, Tallaght, Dublin 24, Ireland. (The acronym "AA" stands for acrylic adhesive.) Loctite® AA V5004 is a two-part structural acrylic adhesive.

It will be appreciated that the method of the invention requires only a (UV) radiation source.

With the method of the invention, it is easier to treat smaller areas, for example using a smaller radiation source e.g. UV source such as a spot lamp or treat large areas for example using an array of UV sources.

The advantages of the invention are many. Dangerous/costly equipment and chemicals are eliminated. No abrasion is required. The equipment is very portable and flexible.

The only health concerns may be protection from exposure to the radiation e.g. UV radiation. But this is easily controlled. For example a user may have to use protective glasses to protect their eyes or the radiation source may be shielded to protect users. Furthermore there are no unwanted by-products such as abraded plastic debris, wasted chemicals, used abrasive material, emitted gases etc.

Accordingly, the process of the present invention compares very favourably with the processes of the prior art.

Any suitable acrylate or methacrylate compositions may be employed. These include those based on acrylate or methacrylate components including: methyl acrylate, methyl methacrylate, 2-ethylhexyacrylate, 2-ethylhexyl methacrylate, tetrahydrofurfuryl acrylate, tetrahydrofurfuryl methacrylate, phenoxyethyl acrylate, phenoxyethyl methacrylate, ethyl acrylate, ethyl methacrylate, propyl acrylate, propyl methacrylate, n-butyl acrylate, n-butyl methacrylate, t-butyl acrylate, t-butyl methacrylate, isobornyl acrylate, isobornyl methacrylate, isooctyl acrylate, isooctyl methacrylate, acrylamide, n-methyl acrylamide, lauryl methacrylate and stearyl methacrylate, cyclohexyl methacrylate, hydroxyethyl acrylate, hydroxyethyl methacrylate, hydroxyethyl acrylate, hydroxypropyl methacrylate.

Other suitable acrylates or methacrylates are multimeric acrylates and methacrylates as shown below:

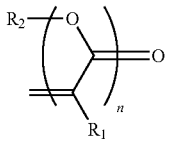

wherein, $R_1$ may be H or $C_1$-$C_{20}$ alkyl, suitably $CH_3$ and $R_2$ can link a plurality of monomeric acrylates and/or methacrylates; wherein $R_2$ may be selected from the group consisting of $C_1$-$C_{20}$ alkyl, $C_2$-$C_{20}$ alkenyl, $C_3$-$C_{20}$ cycloalkyl, $C_3$-$C_{20}$ cycloalkyl optionally having at least one C—C unsaturated bond in the ring, $C_5$-$C_{20}$ aryl, $C_3$-$C_{20}$ heteroaryl, urethane, urea, glycol, ether, polyether or glycidyl component, and combinations thereof, optionally substituted one or more times with at least one of hydroxy, amino, halogen, cyano, nitro, $C_1$-$C_5$ alkoxy, and/or $C_1$-$C_5$ thioalkoxy. n can range from 2 to 4 (inclusive of 2 and 4) acrylate units. Examples include: diethylene glycol diacrylate, diethylene glycol dimethacrylate, 1,6-hexanediol diacrylate, 1,6-hexanediol dimethacrylate, neopentyl glycol diacrylate, neopentyl glycol dimethacrylate, polyethylene glycol diacrylate, polyethylene glycol dimethacrylate, tetraethylene glycol dimethacrylate, tetraethylene glycol dimethacrylate, triethylene glycol diacrylate, triethylene glycol dimethacrylate, trimethylolpropane triacrylate, trimethylolpropane trimethacrylate, pentaerythritol triacrylate, pentaerythritol trimethacrylate, tris(2-hydroxyethyl)Isocyanurate triacrylate, tris(2-hydroxyethyl)Isocyanurate trimethacrylate, tricyclodecanedimethanol diacrylate, tricyclodecanedimethanol dimethacrylate and ethoxylated bisphenol diacrylates and dimethacrylates.

Suitable acrylate or methacrylate monomeric units include methyl acrylate, methyl methacrylate, 2-ethylhexyl acrylate, 2-ethylhexyl methacrylate, lauryl methacrylate, stearyl methacrylate, isobornyl acrylate, diethylene glycol diacrylate, diethylene glycol dimethacrylate, 1,6-hexanediol diacrylate, 1,6-hexanediol dimethacrylate, neopentyl glycol diacrylate, neopentyl glycol dimethacrylate, polyethylene glycol diacrylate, polyethylene glycol dimethacrylate, tetraethylene glycol diacrylate, tetraethylene glycol dimethacrylate, triethylene glycol diacrylate, triethylene glycol dimethacrylate, or the like.

The acrylate or methacrylate component can be present in an amount from about 10 to about 95% weight percentage based on the total weight of the composition, desirably from about 20 to about 85% weight percentage based on the total weight of the composition.

The acrylate or methacrylate composition may comprise a curable component, suitably a maleate, fumarate or maleimide component or combinations thereof. Examples include (but are not limited to) mono-2-(acryloyloxy)ethyl maleate, mono-2-(methacryloyloxy)ethyl maleate, maleic anhydride, maleic acid, toxilic acid, fumaric acid, fumaramide, fumaryl nitrile, fumaryl chloride, fumarate monoethyl ester salts of zinc, calcium and magnesium, 2,5-pyrroledione and 1,1'-(methylenedi-4,1-phenylene) bismaleimide, or combinations thereof.

The maleate, fumarate or maleimide curative component may be present in an amount from about 1 to about 20% weight percentage based on the total weight of the composition, suitably in an amount from about 1.5 to about 10% weight percentage based on the total weight of the composition.

Some embodiments of the present invention may comprise a toughener component. Examples of toughener components include synthetic rubbers, such as acrylonitrile/butadiene rubber (NBR rubber), a polyurethane, styrene/butadiene rubber, styrene/butadiene/methacrylate rubber, chloroprene rubber or butadiene rubber, a natural rubber, a styrene thermoplastic elastomer such as styrene/polybutadiene/styrene synthetic rubber, a polyacrylate or polymethacrylate elastomer, a methacrylate/acrylate block co-polymer or an olefin thermoplastic elastomer such as polystyrene/EPDM (an ethylene/propylene/conjugated diene co-polymer) synthetic rubber. Chlorinated and chlorosulfonated polyethylene elastomers can also be used. The toughener component can also be a mixture or dispersion of these types of materials.

The toughener component can be present in an amount from about 5 to about 50% weight percentage based on the total weight of the composition, desirably in an amount from about 10 to about 30% weight percentage based on the total weight of the composition.

It is to be noted that when the present inventors refer to a curable acrylate or methacrylate component, this includes any curable composition based on curing through acrylate or methacrylate functionality and in particular does not exclude combinations of acrylates and/or methacrylates or indeed components having more than one curable functional group.

It will also be appreciated that combinations of organoborane initiator components may be employed. Combinations of activators for the organoborane component may be used.

Such curable acrylate or methacrylate components are typically formulated as two-part compositions with a Part A and a Part B which are stored separately and then mixed for use for bonding.

Where treating the surface with a (meth)acrylate it is desirable that liquid monomer is applied directly to the surface.

Where treating the surface with copper acrylate a solution of copper acrylate may be utilised. This is applied easily to the surface of the plastic substrate(s) and subsequently exposing the plastic specimen to actinic, e.g. UV, radiation at the correct intensity for the required time prior to application of the adhesive. Any excess solution can be removed after exposure and then the specimen is rendered bondable for adhesive.

Any suitable solution of copper acrylate may be used, for example a solution of copper acrylate in acrylic acid; 2-methyltetrahydrofuran; acetone; or water or any combination thereof.

The present invention works with various substrates and involves subsequently exposing the plastic specimen to actinic, e.g. UV, radiation at the correct intensity for the required time prior to application of the adhesive.

Typically without primers standard anaerobic adhesives do not cure/bond well on plastics. Although primers for plastics are commonplace and work well for subsequent bonding with anaerobic adhesive, primers typically work less well on PEEK as it is a chemically stable plastic. So too for PEKK, PEK, PEEKK, PEKEKK, PARA, PPS or PEI.

The method of the present invention compares well to known methods, for example the use of primers, as it achieves desirable bond strengths with an otherwise difficult to bond material.

Any suitable anaerobically curable compositions may be utilised for subsequent bonding.

Anaerobically curable compositions for use with the present invention include those in which the anaerobically curable component will typically be present in an amount of from about 50% to about 99% by weight of the total composition, for example from about 55% to about 95%.

A curing component (for curing the anaerobically curable component) within the anaerobically curable composition may be present in an amount of from about 0.1 to about 10%, such as from about 1 to about 5%, for example about 5% by weight based on the total weight of the composition.

Desirably the anaerobically curable component includes a rubber component such as a natural or synthetic rubber/elastomeric component. This component may be present in an amount of from about 5 to about 35%, such as from about 10 to about 35%, for example about 15 to about 30% by weight based on the total weight of the composition.

Anaerobic curable compositions may have an anaerobically curable component based on a suitable (meth)acrylate component.

One or more suitable (meth)acrylate components may be selected from among those that are a (meth)acrylate having the formula:

$$H_2C=CGCO_2R^8,$$

where G may be hydrogen, halogen or alkyl groups having from 1 to about 4 carbon atoms, and $R^8$ may be selected from alkyl, cycloalkyl, alkenyl, cycloalkenyl, alkaryl, aralkyl or aryl groups having from 1 to about 16 carbon atoms, any of which may be optionally substituted or interrupted as the case may be with silane, silicon, oxygen, halogen, carbonyl, hydroxyl, ester, carboxylic acid, urea, urethane, polyurethane, carbonate, amine, amide, sulfur, sulfonate, and sulfone.

One or more suitable (meth)acrylates may be chosen from among polyfunctional (meth)acrylates, such as, but not limited to, di- or tri-functional (meth)acrylates like polyethylene glycol di(meth)acrylates, tetrahydrofuran (meth)acrylates and di(meth)acrylates, hydroxypropyl (meth)acrylate ("HPMA"), hexanediol di(meth)acrylate, trimethylol propane tri(meth)acrylate ("TMPTMA"), diethylene glycol dimethacrylate, triethylene glycol dimethacrylate ("TRIEGMA"), tetraethylene glycol dimethacrylate, dipropylene glycol dimethacrylate, di-(pentamethylene glycol) dimethacrylate, tetraethylene diglycol diacrylate, diglycerol tetramethacrylate, tetramethylene dimethacrylate, ethylene dimethacrylate, neopentyl glycol diacrylate, trimethylol propane triacrylate and bisphenol-A mono and di(meth)acrylates, such as ethoxylated bisphenol-A (meth)acrylate ("EBIPMA"), and bisphenol-F mono and di(meth)acrylates, such as ethoxylated bisphenol-F (meth)acrylate.

For example the anaerobically curable component may include Bisphenol A dimethacrylate:

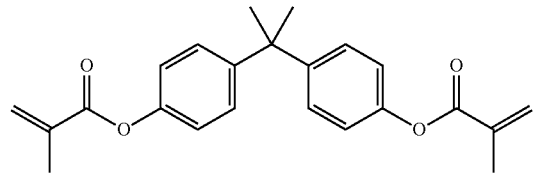 [SMILES: C=C(C)C(=O)Oc1ccc(C(C)(C)c2ccc(OC(=O)C(=C)C)cc2)cc1]

Still other (meth)acrylates that may be suitable for use herein are silicone (meth)acrylate moieties ("SiMA"), such as those taught by and claimed in U.S. Pat. No. 5,605,999 (Chu), the disclosure of which is hereby expressly incorporated herein by reference.

Other suitable materials may be chosen from polyacrylate esters represented by the formula:

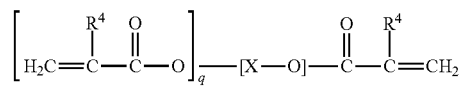

where $R^4$ is a radical selected from hydrogen, halogen or alkyl of from 1 to about 4 carbon atoms; q is an integer equal to at least 1, and preferably equal to from 1 to about 4; and X is an organic radical containing at least two carbon atoms and having a total bonding capacity of q plus 1. With regard to the upper limit for the number of carbon atoms in X, workable monomers exist at essentially any value. As a practical matter, however, a general upper limit is about 50 carbon atoms, such as desirably about 30, and desirably about 20.

For example, X can be an organic radical of the formula:

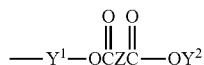

where each of $Y^1$ and $Y^2$ is an organic radical, such as a hydrocarbon group, containing at least 2 carbon atoms, and desirably from 2 to about 10 carbon atoms, and Z is an organic radical, preferably a hydrocarbon group, containing at least 1 carbon atom, and preferably from 2 to about 10 carbon atoms. Other materials may be chosen from the reaction products of di- or tri-alkylolamines (e.g., ethanolamines or propanolamines) with acrylic acids, such as are disclosed in French Pat. No. 1,581,361.

Suitable oligomers with (meth)acrylate functionality may also be used. Examples of such (meth)acrylate-functionalized oligomers include those having the following general formula:

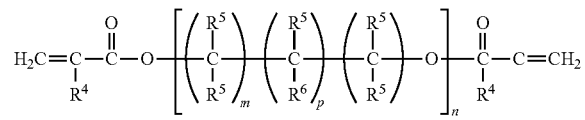

where $R^5$ represents a radical selected from hydrogen, alkyl of from 1 to about 4 carbon atoms, hydroxy alkyl of from 1 to about 4 carbon atoms, or

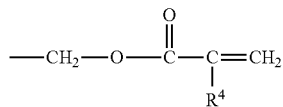

where $R^4$ is a radical selected from hydrogen, halogen, or alkyl of from 1 to about 4 carbon atoms; $R^6$ is a radical selected from hydrogen, hydroxyl, or

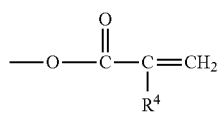

m is an integer equal to at least 1, e.g., from 1 to about 15 or higher, and desirably from 1 to about 8; n is an integer equal to at least 1, e.g., 1 to about 40 or more, and desirably between about 2 and about 10; and p is 0 or 1.

Typical examples of acrylic ester oligomers corresponding to the above general formula include di-, tri- and tetraethyleneglycol dimethacrylate; di(pentamethyleneglycol)dimethacrylate; tetraethyleneglycol diacrylate; tetraethyleneglycol di(chloroacrylate); diglycerol diacrylate; diglycerol tetramethacrylate; butyleneglycol dimethacrylate; neopentylglycol diacrylate; and trimethylolpropane triacrylate.

While di- and other polyacrylate esters, and particularly the polyacrylate esters described in the preceding paragraphs, can be desirable, monofunctional acrylate esters (esters containing one acrylate group) also may be used.

Suitable compounds can be chosen from among are cyclohexylmethacrylate, tetrahydrofurfuryl methacrylate, hydroxyethyl acrylate, hydroxypropyl methacrylate, t-butylaminoethyl methacrylate, cyanoethylacrylate, and chloroethyl methacrylate.

Another useful class of materials are the reaction product of (meth)acrylate-functionalized, hydroxyl- or amino-containing materials and polyisocyanate in suitable proportions so as to convert all of the isocyanate groups to urethane or ureido groups, respectively.

The so-formed (meth)acrylate urethane or urea esters may contain hydroxy or amino functional groups on the non-acrylate portion thereof. (Meth)acrylate esters suitable for use may be chosen from among those of the formula

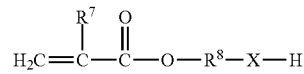

where X is selected from —O— and

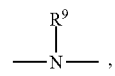

where $R^9$ is selected from hydrogen or lower alkyl of 1 through 7 carbon atoms; $R^7$ is selected from hydrogen, halogen (such as chlorine) or alkyl (such as methyl and ethyl radicals); and $R^8$ is a divalent organic radical selected from alkylene of 1 through 8 carbon atoms, phenylene and naphthylene.

These groups upon proper reaction with a polyisocyanate, yield a monomer of the following general formula:

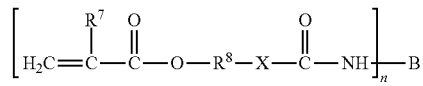

where n is an integer from 2 to about 6; B is a polyvalent organic radical selected from alkyl, alkenyl, cycloalkyl, cycloalkenyl, aryl, alkaryl, alkaryl and heterocyclic radicals both substituted and unsubstituted, and combinations thereof; and $R^7$, $R^8$ and X have the meanings given above.

Depending on the nature of B, these (meth)acrylate esters with urea or urethane linkages may have molecular weights placing them in the oligomer class (such as about 1,000 g/mol up to about 5,000 g/mol) or in the polymer class (such as about greater than 5,000 g/mol).

Other unsaturated reactive monomers and oligomers such as styrenes, maleimides, vinyl ethers, allyls, allyl ethers and those mentioned in U.S. Pat. No. 6,844,080B1 (Kneafsey et al.) can be used. Vinyl resins as mentioned in U.S. Pat. No. 6,433,091 (Xia) can also be used. Methacrylate or acrylate monomers containing these unsaturated reactive groups can also be used.

Of course, combinations of these (meth)acrylates and other monomers may also be used.

Desirably the anaerobically curable component comprises at least one acrylate or methacrylate ester group.

Desirably the anaerobically curable component comprises is chosen from at least one of epoxy (meth)acrylates, urethane (meth)acrylates, urethane di(meth)acrylates, alkyl (meth)acrylates, stearyl (meth)acrylates, isocyanurate (meth)acrylates, bisphenol-A-(meth)acrylates, ethoxylated bisphenol-A-(meth)acrylates, bisphenol-F-(meth)acrylates, ethoxylated bisphenol-F-(meth)acrylates, bisphenol-A di(meth)acrylates, ethoxylated bisphenol-A-di(meth)acrylates, bisphenol-F-di(meth)acrylates, and ethoxylated bisphenol-F-di(meth)acrylates.

The anaerobic compositions may also include other conventional components, such as free radical initiators, free radical accelerators, inhibitors of free radical generation, as well as metal catalysts, such as iron and copper.

A number of well-known initiators of free radical polymerization may be incorporated into the inventive compositions including, without limitation, hydroperoxides, such as CHP, para-menthane hydroperoxide, t-butyl hydroperoxide ("TB H") and t-butyl perbenzoate. Other peroxides include benzoyl peroxide, dibenzoyl peroxide, 1,3-bis(t-butylperoxyisopropyl)benzene, diacetyl peroxide, butyl 4,4-bis(t-butylperoxy)valerate, p-chlorobenzoyl peroxide, cumene hydroperoxide, t-butyl cumyl peroxide, t-butyl perbenzoate, di-t-butyl peroxide, dicumyl peroxide, 2,5-dimethyl-2,5-di-t-butylperoxyhexane, 2,5-dimethyl-2,5-di-t-butyl-peroxyhex-3-yne, 4-methyl-2,2-di-t-butylperoxypentane and combinations thereof.

Such peroxide compounds are typically employed in the present invention in the range of from about 0.1 to about 10 percent by weight, based on the total weight of the composition, with about 1 to about 5 percent by weight being desirable.

If desired the initiator component may be encapsulated. For example the initiator component may be an encapsulated peroxide, for example encapsulated benzoyl peroxide.

Compositions used in the present invention may further comprise thickeners and/or fillers.

As mentioned above it will be appreciated that the composition used in the invention can include non-reactive species including resins. Such components do not participate in an anaerobic cure reaction. They are unreactive. Such components may however become part of the cure product having been incorporated therein during the curing of other components. Examples of such non-reactive species include: fumed silica, polyethylene, polytetrafluoroethylene (PTFE), mica, polyamide wax, titanium dioxide, barium sulphate.

A standard 2K acrylic adhesive can be used to bond the substrate.

For example the invention can involve applying a (meth) acrylic monomer to the surface of a PPS substrate and subsequently exposing the plastic specimen to UV radiation at the correct intensity for the required time prior to application of the adhesive. After UV exposure and the bond strengths achieved with acrylic adhesives to PPS are significantly stronger than those without the UV activated primer. It is noted that with PPS it is not required to incorporate an activator such as TiO2 into the PPS substrate.

This method has been shown to work with acrylic adhesives, e.g. Loctite® AA V5004.

Accordingly, the method of the present invention compares very favourably with state of the art solutions.

BRIEF DESCRIPTION OF THE DRAWINGS

FIG. 1 depicts a bar chart of bond strength measured in MPa under specified aging conditions.

DETAILED DESCRIPTION

Method for Testing of Specimen with Loctite® AA V5004 (Acrylic Adhesive)

Specimen (lap shears) size: 1 inch×4 inch (2.54 cm×10.16 cm) (W×L)

Overlap Size: ¼ inch [1 inch×¼ inch (2.54 cm×0.635 cm) (W×L)]

Two-component adhesive (Loctite® AA V5004) is applied to the bond area on one of the specimens to be bonded from 50 ml syringe via a static mixer nozzle with 16 mixing elements.

Second specimen has no adhesive applied directly. The bonding area of the laps/test specimen are aligned and clamped together with ¼ inch overlap using spring loaded clamps. The adhesive is cured with clamps on at room temperature for 24 hours. Clamps removed once the adhesive is cured. Tested by pulling in shear mode on calibrated tensile testing machine at a rate of 2 mm/min until break. Strength recorded in MPa (N/mm$^2$)

Method for Testing of Specimen with Loctite® HHD8540 (Acrylic Adhesive)

Specimen (lap shears) size: 1 inch×4 inch (2.54 cm×10.16 cm) (W×L)

Overlap Size: ¼ inch [1 inch×¼ inch (2.54 cm×0.635 cm) (W×L)]

Two-component adhesive (Loctite® HHD8540) applied to the bond area on one of the specimen to be bonded from 50 ml syringe via a static mixer nozzle with 16 mixing elements.

Second specimen has no adhesive applied directly. The bonding area of the laps/test specimen are aligned and clamped together with ¼ inch overlap using spring loaded clamps. The adhesive is cured with clamps on at room temperature for 24 hours. Clamps removed once the adhesive is cured. Tested by pulling in shear mode on calibrated tensile testing machine at a rate of 2 mm/min until break. Strength recorded in MPa (N/mm$^2$).

Method for Testing of Specimen with Loctite® 5189 (Anaerobic Adhesive)

Specimen (lap shears) size: 1 inch×4 inch (2.54 cm×10.16 cm) (W×L)

Overlap Size: ¼ inch [1 inch×¼ inch (2.54 cm×0.635 cm) (W×L)]

One-component adhesive applied to one of the specimen to be bonded from 50 ml bottle, no mixing required.

Second specimen has no adhesive applied directly. The bonding area of the laps/test specimen are aligned and clamped together with ¼ inch overlap using spring loaded clamps. The adhesive is cured with clamps on at room temperature for 96 hours. Clamps removed once the adhesive is cured. Tested by pulling in shear mode on calibrated tensile testing machine at a rate of 2 mm/min until break. Strength recorded in MPa (N/mm$^2$). Loctite® 5189 is a liquid anaerobic composition used as a flange sealant.

All bond strength testing was carried out using standard procedure ASTM D3163. Note: All UV intensities are measured by a calibrated PowerPuck® UV radiometer, UV bands as measured by PowerPuck® are: UVC: 250-260 nm, UVB: 280-320 nm, UVA: 320-390 nm and UVV: 395-445 nm.

One grade of polyphenylene sulfide (PPS) was used for all testing in all examples below, this grade is injection moulded Fortran® 6165 PPS. One grade of Polyetherimide (PEI) was used for all testing in all examples below, this grade is Ultem® TECAPEI. One grade of polyarylamide (PARA) was used for all testing in all examples below, this grade is injection moulded Kalix® 9950. One grade Polyether ether ketone (PEEK) was used for all testing in all examples below, this grade is Victrex® 450G which is an unreinforced semi crystalline PEEK. Where a Loctite® UVALOC 1000 was used it was fitted with a Mercury D-type bulb (iron doped). For example it is used as a UV source in Examples 1, 2, 5, 6, 8, 9, 13, 15, 16, 17, 19 and 20 with intensities measured using a calibrated PowerPuck as mentioned above. In other examples, as indicated, a UV LED source was used.

Example 1: PEEK+UV for Acrylic Bonding

Without UV treatment of the lap shears to be bonded, Loctite® HHD8540 (acrylic adhesive) bonds unreinforced semi crystalline PEEK, such as Victrex™ 450G PEEK, lap shears, with a bond strength of 2.7 MPa at which value bond failure occurs.

Exposure of identical PEEK lap shears to UV radiation @110 mW/cm$^2$ from a 375 nm LED lamp for 1 minute before utilising Loctite® HHD8540 (acrylic adhesive) to bond the lap shears gave a significantly higher bond strength of 4.7 MPa, again with bond failure occurring at that value.

Example 2: PEEK+UV for Acrylic Bonding

Without UV treatment of the lap shears to be bonded, Loctite® AA V5004 (acrylic adhesive) bonds unreinforced semi crystalline PEEK, such as Victrex™ 450G PEEK, lap shears, with a bond strength of 3.4 MPa at which value bond failure occurs.

Exposure of identical PEEK lap shears to UV radiation @110 mW/cm$^2$ from a 375 nm LED lamp for 2 minutes before utilising Loctite® AA V5004 (acrylic adhesive) to bond the lap shears gave a significantly higher bond strength of 7.8 MPa, this time with substrate failure occurring at that value.

Exposure of unreinforced semi crystalline PEEK, such as Victrex™ 450G PEEK to UV radiation @110 mW/cm$^2$ from a 375 nm LED lamp for 4 minutes gave a bond strength using Loctite® V5004 (acrylic adhesive) of 4.4 MPa with bond failure.

It will be noted that both exposure times (2 minutes and 4 minutes) give better results than without exposure to UV. However it is noted that the exposure can be optimised. For example exposure for a period from about 10 seconds to about 2 minutes may be optimum for any aspect of the present invention.

Exposure of unreinforced semi crystalline PEEK, such as Victrex™ 450G PEEK to UV radiation from a Loctite® UVALOC 1000 UV Cure Chamber (UVA radiation @124 mW/cm$^2$, UVB radiation @109 mW/cm$^2$, UVC radiation @20 mW/cm$^2$, and UVV radiation @76 mW/cm$^2$) for 2 minutes gave a bond strength utilising Loctite® AA V5004 (acrylic adhesive) of 7.3 MPa with bond failure.

Use of a 375 nm LED handheld source (33 mW/cm$^2$) on unreinforced semi crystalline PEEK, such as Victrex™ 450G PEEK resulted in bonds strengths of 4.5 MPa after 2 minutes of exposure and 4.1 MPa after 4 minutes of exposure, when bonded with Loctite® AA V5004, both exhibiting bond failure.

Example 3: PARA UV for Acrylic Bonding

Lap shears made of a 50% glass fibre reinforced polyarylamide (PARA) (e.g. Kalix 9950) was bonded with Loctite® AA V5004 (acrylic adhesive) without exposure to UV light gave a bond strength of 5.67 MPa at which value bond failure was observed.

Identical lap shears were bonded with Loctite® AA V5004 (acrylic adhesive) after exposure to UV radiation @110 mW/cm$^2$ from 375 nm LED lamp for 2 minutes. A bond strength of 7.52 MPa was achieved at which value bond failure was observed.

Identical lap shears were bonded with Loctite® AA V5004 (acrylic adhesive) after exposure to UV radiation @110 mW/cm$^2$ from 375 nm LED lamp for 4 minutes. A bond strength of 7.92 MPa was achieved at which value bond failure was observed.

LOCTITE® AA V5004 (acrylic adhesive) is a two-part methacrylate composition. Loctite® HHD8540 is a two-part methacrylate composition.

Example 4: PEEK+Primer UV for Anaerobic Bonding

Loctite® 5189 (anaerobic adhesive) does not bond unreinforced semi crystalline PEEK, such as Victrex™ 450G PEEK, lap shears, as the adhesive does not cure in the bond line.

Treating the area of each of the PEEK lap shears that is to be bonded with 1% (w/w) copper acrylate in acrylic acid with subsequent exposure of the treated area of the PEEK to UV radiation @115 mW/cm$^2$ from 375 nm LED lamp for 2 or 4 minutes and then removal of the excess 1% copper acrylate in acrylic acid solution by wiping, and then bonding the lap shears with Loctite® 5189 (anaerobic adhesive) gave bond strengths of 4.9 and 4.4 MPa respectively, both with bond failure.

By comparison applying the 1% copper acrylate in acrylic acid solution to the same kind of PEEK lap shears and not exposing the treated surface to actinic radiation gave a bond strength of 2.52 MPa with bond failure.

So this example shows that without pre-treatment with copper acrylate or UV exposure no bonding occurs. It also shows that with pre-treatment bonding occurs.

Example 5: PEEK+Primer UV for Anaerobic Bonding

Loctite® 5189 (anaerobic adhesive) does not bond unreinforced semi crystalline PEEK, such as Victrex™ 450G PEEK, lap shears, as the adhesive does not cure in the bond line.

Treating the area of each of the PEEK lap shears with 1% (w/w) copper acrylate in acrylic acid with subsequent exposure of the treated PEEK to UV radiation from a Loctite® UVALOC 1000 UV Cure Chamber (UVA radiation @124 mW/cm$^2$, UVB radiation @109 mW/cm$^2$, UVC radiation @20 mW/cm$^2$, and UVV radiation @76 mW/cm$^2$) for respectively 30 seconds or 1 minute and then removal of the excess 1% copper acrylate in acrylic acid solution by wiping, and then bonding the lap shears with Loctite® 5189 (anaerobic adhesive) gave bond strengths of 7.0 or 8.3 MPa respectively with bond failure.

Example 6: PEEK+Primer UV for Anaerobic Bonding

Loctite® 5189 (anaerobic adhesive) does not bond unreinforced semi crystalline PEEK, such as Victrex™ 450G PEEK, lap shears, as the adhesive does not cure in the bond line.

Treating the area of each of the PEEK lap shears with 3% (w/w) copper acrylate in 2-methyltetrahydrofuran with subsequent exposure of the treated PEEK to UV radiation @UVA: 213 mW/cm$^2$, UVB: 189 mW/cm$^2$, UVC: 36 mW/cm$^2$, UVV: 135 mW/cm$^2$ from UV Mercury lamp with D-type bulb fitted for 2 or 4 minutes and then removal of the excess copper acrylate solution by wiping gave bond strengths of 5.3 MPa and 4.8 MPa (respectively) with bond failure.

Applying the 3% copper acrylate in 2-methyltetrahydrofuran solution and bonding the PEEK without prior exposure to UV gave a bond strength of 0.89 MPa with adhesive failure.

Example 7: PEEK+Primer UV for Anaerobic Bonding

Loctite® 5189 (anaerobic adhesive) does not bond unreinforced semi crystalline PEEK, such as Victrex™ 450G PEEK, lap shears, as the adhesive does not cure in the bond line.

Treating the area of each of the PEEK lap shears with 3% copper acrylate in acetone with subsequent exposure of the treated PEEK to UV radiation @115 mW/cm$^2$ from 375 nm LED lamp for 2 or 4 minutes and then removal of the excess copper acrylate solution by wiping gave bond strengths of 3.5 MPa or 3.2 MPa (respectively) with bond failure.

Applying the PEEK with 3% copper acrylate in acetone with subsequent exposure of the treated PEEK to UV radiation @1 W/cm$^2$ from 375 nm LED lamp for 2 or 4 minutes and then removal of the excess copper acrylate solution by wiping gave bond strengths of 5.1 MPa and 4.1 MPa (respectively) with bond failure.

Applying the 3% copper acrylate in acetone solution and bonding the PEEK without prior exposure to UV gave a bond strength of 0.96 MPa with bond failure.

Example 8: PARA+Primer UV for Anaerobic Bonding

Loctite® 5189 (anaerobic adhesive) does not bond PARA (Kalix 9950), as the adhesive does not cure in the bond line.

Applying 3% copper acrylate in 2-methyltetrahydrofuran to the PARA with subsequent exposure of the treated PARA to UV radiation @UVA: 213 mW/cm$^2$, UVB: 189 mW/cm$^2$, UVC: 36 mW/cm$^2$, UVV: 135 mW/cm$^2$ from UV Mercury lamp with D-type bulb fitted for 2 or 4 minutes and then removal of the excess copper acrylate solution by wiping gave bond strengths of 6.0 MPa and 8.1 MPa (respectively) with bond failure.

Applying the 3% copper acrylate in 2-methyltetrahydrofuran solution and bonding the PARA without prior exposure to UV gave a bond strength of 5.5 MPa with adhesive failure.

Example 9: PPS+Primer UV for Anaerobic Bonding

Loctite® 5189 (anaerobic adhesive) without primer does not bond Fortran 6165 PPS, the adhesive does not cure in the bond line.

Applying 3% copper acrylate in 2-methyltetrahydrofuran to the PPS with subsequent exposure of the treated PPS to UV radiation @UVA: 213 mW/cm$^2$, UVB: 189 mW/cm$^2$, UVC: 36 mW/cm$^2$, UVV: 135 mW/cm$^2$ from UV Mercury lamp with D-type bulb fitted for 2 or 4 minutes and then removal of the excess copper acrylate solution by wiping gave bond strengths of 5.2 MPa and 4.9 MPa (respectively) with bond failure.

Applying the 3% copper acrylate in 2-methyltetrahydrofuran solution and bonding the PPS without prior exposure to UV gave a bond strength of 3.3 MPa with bond failure.

Example 10: PEEK+Primer UV for Anaerobic Bonding

Loctite® 5189 (anaerobic adhesive) without primer does not bond unreinforced semi crystalline PEEK, such as Victrex™ 450G PEEK, the adhesive does not cure in the bond line.

Applying 3% copper acrylate in water to the PEEK with subsequent exposure of the treated PEEK to UV radiation @115 mW/cm$^2$ from 375 nm LED lamp for 2 or 4 minutes and then removal of the excess copper acrylate solution by wiping gave bond strengths of 3.1 MPa and 4.3 MPa (respectively) with bond failure.

Applying the 3% copper acrylate in water solution and bonding the PEEK without prior exposure to UV gave a bond strength of 0.4 MPa with bond failure.

Example 11: PPS+Primer UV for Acrylic Bonding

Loctite® AA V5004 (acrylic adhesive) bonds PPS in lap shear test at 7.4 MPa with adhesive failure.

Exposing the same substrate to UV radiation (375 nm UV LED, 115 mW/cm$^2$ for 4 minutes) and then bonding with the same adhesive gave no improvement in bond strengths obtained.

The area of each of the PPS lap shears was treated with methacrylic acid and exposed to varying intensities of UV radiation at 375 nm from an LED source for various times. The table below shows the times, intensities and bond strengths achieved.

| Intensity of UV radiation at 375 nm (mW/cm$^2$) | Time Exposed to radiation for (s) | Average bond strength achieved (MPa) |
| --- | --- | --- |
| 0 | 0 | 9.5 |
| 115 | 120 | 7.4 |
| 115 | 240 | 10.2 |
| 1000 | 10 | 8.9 |
| 1000 | 20 | 10.6 |
| 1000 | 30 | 12.9 |
| 1000 | 60 | 12.9 |
| 1000 | 120 | 11.6 |
| 1000 | 240 | 12.1 |

These results show that priming with methacrylic acid alone increases the bond strength obtained, but the combination of a correct amount (dose) of actinic radiation such as UV together with the methacrylic acid significantly improve the bond strengths obtained using a 2K acrylic on PPS. Provided that there is a minimum exposure to actinic radiation of greater than 14 Joules/cm$^2$, for example greater than about 15 Joules/cm$^2$, such as greater than about 17 Joules/cm$^2$, for example greater than about 18 Joules/cm$^2$ such as greater than 19 Joules/cm$^2$ desirably greater than about 20 Joules/cm$^2$.

The present inventors believe that the drop in bond strengths to 7.4 MPa and 8.9 MPa seen in two of the results in the table immediately above does signify a change (reaction) happening on the surface. Without being limited to any specific mode of action it is thought that a change (reaction) needs to reach a certain state before the benefit of actinic radiation, such as UV, utilised in combination with the methacrylic acid, is seen. Accordingly exposure to the actinic radiation for a time sufficient to see the benefit is required.

Example 12: PPS+Primer UV for Acrylic Bonding

The area of the PPS lap shears to be bonded were respectively pre-treated with *THFA, MMA and IBOA, then exposed to UV radiation at an intensity of 1 W/cm$^2$ at 375 nm from an LED source for varying times. These activated substrates were then bonded with Loctite® AA V5004 (acrylic adhesive). The table below shows the material used for pre-treatment and the corresponding time of UV exposure and the bond strengths achieved.

| Primer/pre-treatment* | Average Strength (MPa) |
|---|---|
| Brushed with THFA, no UV exposure | 11.92 |
| Brushed with THFA and then UV for 30 s | 16.22 |
| Brushed with THFA and then UV for 1 min | 13.34 |
| Brushed with MMA, no UV exposure | 12.30 |
| Brushed with MMA and then UV for 30 s | 13.73 |
| Brushed with MMA and then UV for 1 min | 15.81 |
| Brushed with IBOA, no UV exposure | 12.46 |
| Brushed with IBOA and then UV for 30 s | 15.06 |
| Brushed with IBOA and then UV for 1 min | 18.17 |

These results show that priming with a (meth)acrylate alone increases the bond strength obtained, but the combination of UV and (meth)acrylate significantly improve the bond strengths obtained using a two-part acrylic on PPS.

*THFA: tetrahydrofurfuryl acrylate; MMA: methyl methacrylate; IBOA: isobornyl acrylate Example 13: PPS+Primer UV for Acrylic Bonding The area of the PPS lap shears to be bonded were pre-treated with IBOA, then exposed to UV from a Mercury D-bulb for 30 seconds or 1 minute at the following intensity (measured by a calibrated Power Puck®): 109 mW/cm$^2$ UVV (395-445 nm), 184 mW/cm$^2$ UVA (320-390 nm), 169 mW/cm$^2$ UVB (280-320 nm) and 30 mW/cm$^2$ UVC (250-260 nm). These were then left at room temperature for 2 weeks and then bonded with Loctite® AA V5004 (acrylic adhesive) to give the following average bond strengths.

Exposure time 30 seconds: bond strength 16.8 MPa
Exposure time 1 minute: bond strength 11.4 MPa.

These results show that the priming effect can be obtained with actinic radiation such as UV of varying wavelengths and that the resulting primed surface is stable for at least 2 weeks after priming. It also shows that there is an optimum exposure. So even though the bond strength after 1 minute is lower than the bond strength after 30 seconds there is still an overall positive impact on the bond strength after 1 minute.

Example 14: PPS+Primer UV for Acrylic Bonding

The area of the PPS lap shears to be bonded were treated with IBOA, then exposed to UV radiation at an intensity of 1 W/cm$^2$ at 375 nm from an LED source for 1 minute. These primed substrates were then bonded with Loctite® AA V5004 (acrylic adhesive). The some of the laps were tested initially and then some of the bonded items were then subjected to aging at 65° C./95% relative humidity and 60° C. dry for two weeks. Also, while the aging cycle was being undertaken some of the bonded laps were left at room temperature for the same period. The results are in FIG. 1.

These results indicate that this priming method is stable to the ageing cycles carried out.

Example 15: PEEK UV for Epoxy Bonding

Loctite® EA 9492 without UV treatment bonds PEEK (Victrex 450G) at 4.5 MPa with adhesive failure. Loctite® EA 9492 is a high temperature resistant, two component epoxy adhesive.

Exposing the area to be bonded to UV radiation from a Mercury D-type bulb at 193 mW/cm$^2$ in UVA, 183 mW/cm$^2$ in UVB, 35 mW/cm$^2$ in UVC, 136 mW/cm$^2$ in UVV for varying times gave the following results.

| Exposure time (sec) | Bond Strength (MPa) |
|---|---|
| 75 | 8.26 |
| 90 | 9.46 |
| 105 | 10.06 |
| 120 | 11.33 |
| 135 | 12.38 |
| 150 | 8.17 |
| 165 | 6.71 |
| 180 | 8.00 |

These results show that with enough exposure there are significant gains in observed bond strength but also that too much exposure can decrease this effect (although still better than without any UV exposure).

Example 16: PEEK UV for Epoxy Bonding

Loctite® EA9696 without UV treatment bonds PEEK (Victrex 450G) at 4.5 MPa with adhesive failure. Loctite® EA9696 is a modified epoxy film adhesive.

Exposing the area to be bonded to UV radiation from a Mercury D-type bulb at 193 mW/cm$^2$ in UVA, 183 mW/cm$^2$ in UVB, 35 mW/cm$^2$ in UVC, 136 mW/cm$^2$ in UVV for 130 seconds gave 11.45 MPa bond strengths.

Loctite® EA9696 bonds Carbon Fibre Reinforced (CFR) PEEK (Tencate Cetex TC1200) without UV treatment at 16.43 MPa with adhesive failure. Exposing the area to be bonded to UV radiation from a Mercury D-type bulb at 1801 mW/cm$^2$ in UVA, 502 mW/cm$^2$ in UVB, 65 mW/cm$^2$ in UVC, 2322 mW/cm$^2$ in UVV for 5 seconds gave 38.34 MPa bond strengths with mixed cohesive and adhesive failure modes seen.

Tests have indicated that when the surface of the CFR-PEEK is activated using this method it remains active for bonding for at least 4 weeks.

Example 17: PEEK UV for Epoxy Bonding

Loctite® EA9394 without UV treatment bonds PEEK (Victrex 450G) at 3.4 MPa with adhesive failure. Loctite® EA9394 is a two-part epoxy structural paste adhesive.

Exposing the area to be bonded to UV radiation from a Mercury D-type bulb at 193 mW/cm$^2$ in UVA, 183 mW/cm$^2$ in UVB, 35 mW/cm$^2$ in UVC, 136 mW/cm$^2$ in UVV for 130 seconds gave 8.8 MPa bond strengths.

Loctite® EA9394 bonds Carbon Fibre Reinforced (CFR) PEEK (Tencate Cetex TC1200) without UV treatment at 2.5 MPa with adhesive failure. Exposing the area to be bonded to UV radiation from a Mercury D-type bulb at 1801 mW/cm$^2$ in UVA, 502 mW/cm2 in UVB, 65 mW/cm2 in UVC, 2322 mW/cm$^2$ in UVV for 25 seconds gave 29.86 MPa bond strengths with adhesive failure.

Example 18: PEI and PPS UV for Epoxy Bonding

Loctite® EA 9492 (epoxy adhesive) without UV treatment bonds PEI at 11.9 MPa and PPS at 12.2 MPa with adhesive failure.

Exposure of the PEI to UV radiation @1 W/cm$^2$ from 375 nm LED lamp for 1 minute and bonding with Loctite® EA 9492 (epoxy adhesive) gave a bond strength of 19.5 MPa with substrate failure on PEI and 17.4 with adhesive failure on PPS.

Example 19: PPS UV for Epoxy Bonding

Loctite® EA 9492 (epoxy adhesive) without UV treatment bonds PPS at 12.2 MPa with adhesive failure.

Exposure of the PPS to UV radiation from a UVALOC 1000 fitted with a Mercury D bulb (UVA@213 mW/cm$^2$, UVB@189 mW/cm$^2$, UVC@36 mW/cm$^2$ and UVV: 135 mW/cm$^2$, as measured with a calibrated PowerPuck and bonding with Loctite® EA 9492 (epoxy adhesive) gave a bond strength greater than 18 MPa with structural failure of the substrate.

Loctite® EA9394 (epoxy adhesive) bonds carbon fibre reinforced (CFR) PPS (Tencate Cetex TC1100) without UV treatment at 5.3 MPa with adhesive failure. Exposing the area to be bonded to UV radiation from a Mercury D-type bulb at 1653 mW/cm$^2$ in UVA, 436 mW/cm$^2$ in UVB, 61 mW/cm$^2$ in UVC, 2275 mW/cm$^2$ in UVV for 20 seconds gave 39.0 MPa bond strengths with adhesive failure.

Loctite® EA9696 bonds CFR PPS (Tencate Cetex TC1100) without UV treatment at 8.17 MPa with adhesive failure. Exposing the area to be bonded to UV radiation from a Mercury D-type bulb at 1870 mW/cm$^2$ in UVA, 703 mW/cm$^2$ in UVB, 96 mW/cm$^2$ in UVC, 2548 mW/cm$^2$ in UVV for 10 seconds gave 31.83 MPa bond strengths with mixed cohesive and adhesive failure modes seen and increasing that time to 40 seconds at the same intensities gave 40.29 MPa bond strengths with mixed cohesive failure of the adhesive and structural failure of the substrate.

Tests have indicated that when the surface of the CFR-PPS is activated using this method it remains active for bonding for at least 4 weeks.

Example 20: PPS UV for Epoxy Bonding

PPS laps were exposed to UV radiation from a UVALOC 1000 fitted with a Mercury D bulb (UVA@213 mW/cm$^2$, UVB@189 mW/cm$^2$, UVC@36 mW/cm$^2$ and UVV: 135 mW/cm$^2$, as measured with a calibrated PowerPuck™) for 1 minute.

These UV activated PPS laps were bonded with Loctite® 9514 (one-part epoxy) and gave bond strengths greater than 22 MPa with 100% substrate failure. Loctite® 9514 is a toughened one-part heat curing epoxy adhesive.

Example 21: PPS and PEI UV for Epoxy Bonding

PPS and PEI laps were exposure to UV radiation from a 375 nm LED flood system at 115 mW/cm$^2$ for 2 minutes.

The UV activated PPS bonded with Loctite® EA 9492 (epoxy adhesive) was exposed to environmental aging at 60° C. (dry) and at 65° C. 95% relative humidity for two weeks. There was no significant change in bond strengths, with a 20% standard deviation in initial strengths and all changes after aging less than 10% from the original strength.

The same tests were carried out with the UV activated PEI bonded with Loctite® EA 9492 (epoxy adhesive).

There was no significant change in bond strengths, with an 8% standard deviation in initial strengths and all changes after aging less than 7% from the original strength

Example 22: PEEK UV and Acrylic Monomer for 2K Acrylic Bonding

Loctite® V5004 without UV treatment bonds PEEK (Victrex 450G) at 3.4 MPa with adhesive failure.

Brushing the surface with methacrylic acid and then exposing the coated area to UV radiation at 110 mW/cm$^2$ 375 nm LED 4 minutes, gave 7.1 MPa bond with substrate failure being observed.

Example 23: PEI UV for 2K Acrylic Bonding

Loctite® V5004 without UV treatment bonds PEI (Tecapei Ultem) at 5.3 MPa with adhesive failure.

Exposing the area to be bonded to UV radiation at 110 mW/cm$^2$ 375 nm LED 30 seconds, gave 6.4 MPa bond with adhesive failure.

Exposing the area to be bonded to UV radiation at 110 mW/cm$^2$ 375 nm LED 1 minute, gave 9.3 MPa bond with adhesive failure.

Example 24: PEI UV+Copper Acrylate for Anaerobic Bonding

Loctite® 5189 (anaerobic adhesive) without primer does not bond PEI (Tecapei Ultem) the adhesive does not cure in the bond line.

Applying 1% copper acrylate in Acrylic acid to the area of PEI to be bonded with subsequent exposure of the coated section of the PEI to UV radiation @115 mW/cm$^2$ from 375 nm LED lamp for 30 seconds, 1 minute, 2 minutes or 4 minutes and then removal of the excess 1% copper acrylate in acrylic acid solution by wiping gave bond strengths of 3.4, 3.4, 3.2 and 4.7 MPa (respectively) with adhesive failure when bonded with Loctite® 5189 (anaerobic adhesive).

Applying the 1% Copper Acrylate in Acrylic acid solution and not exposing the coated surface gave a bond strength of 2.0 MPa with adhesive failure when bonded with Loctite® 5189 (anaerobic adhesive).

Example 25: PEKK UV for Epoxy Bonding

Loctite® EA9394 without UV treatment bonds PEKK at 9.9 MPa with adhesive failure. Loctite® EA9394 is a two-part epoxy structural paste adhesive.

Exposing the area to be bonded to UV radiation @1 W/cm$^2$ from 375 nm LED lamp for 60 seconds before bonding with Loctite® EA9394 gave a bond strength of 30.8 MPa with adhesive failure.

Exposing the area to be bonded to UV radiation from a Mercury D-type bulb at 3.5 W/cm$^2$ for 10 seconds gave 34.6 MPa bond strength with adhesive failure. Exposing the area to be bonded to UV radiation from a Mercury D-type bulb at 3.5 W/cm$^2$ for 30 seconds gave 37.5 MPa bond strength with mixed adhesive and cohesive failure.

The words "comprises/comprising" and the words "having/including" when used herein with reference to the present invention are used to specify the presence of stated features, integers, steps or components but do not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

What is claimed is:

1. A method of activating a surface of a plastics substrate formed from:
   (a) polyaryletherketone;
   (b) a polymer containing a phenyl group directly attached to a carbonyl group, wherein the carbonyl group is part of an amide group;
   (c) polyphenylene sulfide (PPS); or
   (d) polyetherimide (PEI);
   for subsequent bonding,
   the method comprising the step of exposing the surface to actinic radiation wherein the actinic radiation:
   includes radiation with wavelength in the range from about 10 nm to about 1000 nm;
   the energy of the actinic radiation to which the surface is exposed is in the range from about 0.5 J/cm$^2$ to about 300 J/cm$^2$; the method comprising a step of treating the surface with copper acrylate, prior to exposing the surface to actinic radiation.

2. A method according to claim 1 wherein the exposing of the surface to actinic radiation is applied selectively to create areas of the surface that are activated for subsequent bonding and areas of the surface that are not activated for subsequent bonding.

3. A method according to claim 2 wherein a mask is used which has areas which transmit actinic radiation to create areas of the surface that are activated for subsequent bonding areas and areas which block actinic radiation to create areas of the surface that are not activated for subsequent bonding.

4. A method of activating a surface according to claim 1, the method comprising the step of treating the surface with a (meth)acrylate, prior to exposing the surface to actinic radiation optionally wherein the (meth)acrylate is selected from tetrahydrofurfuryl acrylate (THFA); methyl methacrylate (MMA); and isobornyl acrylate (I BOA) and any combination thereof.

5. A method according to claim 4 wherein:
   the plastics substrate is PPS; and/or
   the activating is carried out for subsequent bonding with acrylic adhesive; and/or
   the energy of the actinic radiation to which the surface is exposed is in the range from about 25 J/cm$^2$ to about 240 J/cm$^2$.

6. A method of activating a surface according to claim 1 wherein the actinic radiation includes radiation with wavelength in the range from about 200 nm to about 700 nm.

7. A method according to claim 1 wherein the energy of the actinic radiation to which the surface is exposed is in the range from about 0.5 J/cm$^2$ to about 240 J/cm$^2$.

8. A method according to claim 1 wherein the duration of the exposure is from about 0.1 seconds to about 360 minutes.

9. A method of activating a surface according to claim 1 wherein the activating is carried out for subsequent bonding with an acrylic adhesive, optionally wherein the energy of the actinic radiation to which the surface is exposed is in the range from about 1.5 J/cm$^2$ to about 240 J/cm$^2$.

10. A method according to claim 1 wherein:
    the energy of the actinic radiation to which the surface is exposed is in the range from about 3.5 J/cm$^2$ to about 100 J/cm$^2$; and/or
    the substrate is PPS, PARA or PEI; and/or
    activating is carried out for subsequent bonding with acrylic adhesive.

11. A method according to claim 1 wherein:
    the energy of the actinic radiation to which the surface is exposed is in the range from about 2 J/cm$^2$ to about 240 J/cm$^2$; and/or
    the substrate is PEEK, PEKK, PEK, PEEKK, PEKEKK, PPS, or PEI; and/or
    activating is carried out for subsequent bonding with epoxy adhesive.

12. A method of activating a surface to claim 1 wherein the activating is carried out for subsequent bonding with an epoxy adhesive.

13. A method according to claim 1 wherein:
    the energy of the actinic radiation to which the surface is exposed is in the range from about 3 J/cm$^2$ to about 240 J/cm$^2$; and/or
    activating is carried out for subsequent bonding with anaerobic adhesive.

14. A method of activating a surface according to claim 1 wherein the activating is carried out for subsequent bonding with an anaerobic adhesive.

15. A method of bonding a first substrate formed from:
    (a) polyaryletherketone;
    (b) a polymer containing a phenyl group directly attached to a carbonyl group, wherein the carbonyl group is part of an amide group;
    (c) polyphenylene sulfide (PPS); or
    (d) polyetherimide (PEI);
    to a second substrate comprising the steps of:
    (i) exposing the surface of the first substrate to actinic radiation to activate the surface for subsequent bonding wherein the actinic radiation includes radiation with wavelength in the range from about 10 nm to about 1000 nm; and the energy of the actinic radiation to which the surface is exposed is in the range from about 0.5 J/cm$^2$ to about 300 J/cm$^2$,
    (ii) subsequently, bonding the activated surface of the first substrate to the second substrate utilising adhesive;
    wherein the method comprises a step of treating the surface with copper acrylate, prior to exposing the surface to actinic radiation.

16. A method of bonding according to claim 15, the method comprising the step of treating the surface with a (meth)acrylate, prior to exposing the surface to actinic radiation.

17. A method of activating a surface of a plastics substrate formed from: polyaryletherketone;
    for subsequent bonding,
    the method comprising the step of exposing the surface to actinic radiation wherein the actinic radiation:
    includes radiation with wavelength in the range from about 10 nm to about 1000 nm;
    and the energy of the actinic radiation to which the surface is exposed in a time of about 30 seconds to about 4 minutes, is in the range from about 3.5 J/cm$^2$ to about 40 J/cm$^2$ for subsequent bonding with acrylic adhesive; or
    the energy of the actinic radiation to which the surface is exposed is in the range from about 4 J/cm$^2$ to about 850 J/cm$^2$ for subsequent bonding with epoxy adhesive.

18. A method of activating a surface of a plastics substrate formed from polyarylamide (PARA), for subsequent bonding,
the method comprising the step of exposing the surface to actinic radiation wherein the actinic radiation:
includes radiation with wavelength in the range from about 10 nm to about 1000 nm; and
the energy of the actinic radiation to which the surface is exposed is in the range from about 10 J/cm² to about 30 J/cm² for subsequent bonding with acrylic adhesive.

19. A method of activating a surface of a plastics substrate formed from polyphenylene sulfide (PPS), for subsequent bonding,
the method comprising the step of applying copper acrylate to the surface and then exposing the surface to actinic radiation wherein the actinic radiation
includes radiation with wavelength in the range from about 10 nm to about 1000 nm; and
the energy of the actinic radiation to which the surface is exposed is in the range from about 2 J/cm² to about 240 J/cm² for subsequent bonding with acrylic adhesive optionally wherein the surface is treated with (meth) acrylate selected from tetrahydrofurfuryl acrylate (THFA); methyl methacrylate (MMA); or isobornyl acrylate (I BOA) or any combination thereof, prior to exposing the surface to the actinic radiation,
or the energy of the actinic radiation to which the surface is exposed is in the range from about 5 J/cm² to about 312 J/cm² for subsequent bonding with epoxy adhesive.

20. A method of activating a surface of a plastics substrate formed from polyarylamide (PARA), for subsequent bonding,
the method comprising the step of exposing the surface to actinic radiation for a time of about 30 seconds to about 4 minutes, wherein the actinic radiation:
includes radiation with wavelength in the range from about 10 nm to about 1000 nm;
the energy of the actinic radiation to which the surface is exposed is in the range from about 10 J/cm² to about 30 J/cm² for subsequent bonding with acrylic adhesive.

21. A method of activating a surface of a plastics substrate formed from polyetherimide (PEI), for subsequent bonding,
the method comprising the step of exposing the surface to actinic radiation for a time of about 30 seconds to 2 minutes, wherein the actinic radiation:
includes radiation with wavelength in the range from about 10 nm to about 1000 nm;
the energy of the actinic radiation to which the surface is exposed is in the range from about 3 J/cm² to about 10 J/cm² for subsequent bonding with acrylic adhesive,
or the energy of the actinic radiation to which the surface is exposed is in the range from about 6 J/cm² to about 120 J/cm² for subsequent bonding with epoxy adhesive.

22. A method of activating a surface of a plastics substrate formed from: polyaryletherketone;
for subsequent bonding,
the method comprising the steps of
treating the surface with copper acrylate, prior to exposing the surface to actinic radiation,
exposing the surface to actinic radiation wherein the actinic radiation:
includes radiation with wavelength in the range from about 10 nm to about 1000 nm;
and the energy of the actinic radiation to which the surface is exposed is in the range from about 9 J/cm² to about 240 J/cm² for subsequent bonding with anaerobic adhesive.

23. A method of activating a surface of a plastics substrate formed from: polyarylamide (PPS) for subsequent bonding,
the method comprising the steps of
treating the surface with copper acrylate, prior to exposing the surface to actinic radiation,
exposing the surface to actinic radiation wherein the actinic radiation:
includes radiation with wavelength in the range from about 10 nm to about 1000 nm;
and the energy of the actinic radiation to which the surface is exposed is in the range from about 14 J/cm² to about 30 J/cm² for subsequent bonding with anaerobic adhesive.

24. A method of activating a surface of a plastics substrate formed from: polyarylamide (PARA) for subsequent bonding,
the method comprising the steps of
treating the surface with copper acrylate, prior to exposing the surface to actinic radiation,
exposing the surface to actinic radiation wherein the actinic radiation:
includes radiation with wavelength in the range from about 10 nm to about 1000 nm;
and the energy of the actinic radiation to which the surface is exposed is in the range from about 10 J/cm² to about 30 J/cm² for subsequent bonding with anaerobic adhesive.

25. A method of activating a surface of a plastics substrate formed from: polyetherimide (PEI) for subsequent bonding,
the method comprising the steps of
treating the surface with copper acrylate, prior to exposing the surface to actinic radiation,
exposing the surface to actinic radiation wherein the actinic radiation:
includes radiation with wavelength in the range from about 10 nm to about 1000 nm;
and the energy of the actinic radiation to which the surface is exposed is in the range from about 3 J/cm² to about 30 J/cm² for subsequent bonding with anaerobic adhesive.

* * * * *